(12) United States Patent
Hamdi et al.

(10) Patent No.: US 10,133,648 B2
(45) Date of Patent: *Nov. 20, 2018

(54) POWER OVER ETHERNET DYNAMIC POWER ALLOCATION SYSTEM

(71) Applicant: Dell Products L.P., Round Rock, TX (US)

(72) Inventors: Rabah S. Hamdi, Spring, TX (US); Saikrishna M. Kotha, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/803,709

(22) Filed: Jul. 20, 2015

(65) Prior Publication Data
US 2015/0339206 A1 Nov. 26, 2015

Related U.S. Application Data

(63) Continuation of application No. 13/776,466, filed on Feb. 25, 2013, now Pat. No. 9,110,972.

(51) Int. Cl.
| | |
|---|---|
| *G06F 11/30* | (2006.01) |
| *G06F 1/00* | (2006.01) |
| *H04L 12/66* | (2006.01) |
| *H04L 12/10* | (2006.01) |
| *H04L 12/26* | (2006.01) |
| *G06F 1/26* | (2006.01) |
| *G06F 1/28* | (2006.01) |
| *G06F 1/32* | (2006.01) |

(52) U.S. Cl.
CPC ............ *G06F 11/3062* (2013.01); *G06F 1/26* (2013.01); *G06F 1/266* (2013.01); *G06F 1/28* (2013.01); *G06F 1/3203* (2013.01); *G06F 1/3209* (2013.01); *G06F 11/3027* (2013.01); *H04L 12/10* (2013.01); *H04L 43/08* (2013.01); *Y04S 40/168* (2013.01)

(58) Field of Classification Search
CPC ........................................................ G06F 1/30
USPC ........................................................ 713/340
See application file for complete search history.

(56) References Cited

U.S. PATENT DOCUMENTS

| | | |
|---|---|---|
| 6,449,253 B1 | 9/2002 | Ott |
| 7,155,622 B2 | 12/2006 | Mancey et al. |
| 7,221,261 B1 | 5/2007 | Klingensmith et al. |
| 7,240,224 B1 | 7/2007 | Biederman |
| 7,337,336 B2 | 2/2008 | Ferentz et al. |

(Continued)

*Primary Examiner* — Suresh Suryawanshi
(74) *Attorney, Agent, or Firm* — Haynes and Boone, LLP

(57) ABSTRACT

A power allocation system includes a manager provided on a network controller. An agent is provided on a line module coupled to the network controller. The agent is operable to detect a connection of a powered device to a port on the line module and communicate that to the manager. The manager then classifies the powered device and provides a first power to the powered device through the port from a global power budget according to the classification. At least one of the manager and agent then monitor the power consumption of the powered device subsequent to providing the first power, and a second power is provided to the powered device through the port from the global power budget according to the monitoring, wherein the second power is different from the first power.

20 Claims, 4 Drawing Sheets

(56) References Cited

U.S. PATENT DOCUMENTS

| | | | | |
|---|---|---|---|---|
| 7,340,620 | B2 | 3/2008 | Dove | |
| 7,392,407 | B2 | 6/2008 | Jonnala et al. | |
| 7,460,889 | B2 | 12/2008 | Darshan et al. | |
| 7,603,570 | B2 * | 10/2009 | Schindler | G06F 1/3203 713/300 |
| 7,613,939 | B2 * | 11/2009 | Karam | H04L 12/10 702/60 |
| 7,647,510 | B2 * | 1/2010 | Landry | H04L 12/10 713/300 |
| 7,698,580 | B2 | 4/2010 | Schindler et al. | |
| 7,849,333 | B2 | 12/2010 | Schindler | |
| 7,921,314 | B2 * | 4/2011 | Schindler | G06F 1/3203 713/300 |
| 8,001,397 | B2 | 8/2011 | Hansalia | |
| 8,132,029 | B2 | 3/2012 | Alms et al. | |
| 8,171,315 | B2 * | 5/2012 | Karam | H04L 12/10 713/300 |
| 8,205,102 | B2 | 6/2012 | Kabbara et al. | |
| 8,225,124 | B2 * | 7/2012 | Geiger | H04L 12/10 713/320 |
| 8,250,381 | B2 * | 8/2012 | Hansalia | G06F 1/266 307/35 |
| 8,261,104 | B2 * | 9/2012 | Landry | H04L 12/10 713/300 |
| 8,301,918 | B2 * | 10/2012 | Diab | G06F 1/3209 307/29 |
| 8,340,111 | B1 | 12/2012 | Krivitski et al. | |
| 8,352,754 | B2 * | 1/2013 | Chin | H04L 12/10 713/300 |
| 8,375,232 | B2 | 2/2013 | Khan et al. | |
| 8,674,546 | B1 | 3/2014 | Dix et al. | |
| 8,793,511 | B1 | 7/2014 | Bishara | |
| 9,100,196 | B2 * | 8/2015 | Zimmerman | H04L 12/10 |
| 9,110,972 | B2 | 8/2015 | Hamdi et al. | |
| 9,146,613 | B2 | 9/2015 | Hamdi et al. | |
| 9,164,558 | B2 * | 10/2015 | Jain | H04L 12/413 |
| 9,665,148 | B2 | 5/2017 | Hamdi et al. | |
| 9,727,110 | B2 | 8/2017 | Hamdi et al. | |
| 2004/0230846 | A1 | 11/2004 | Mancey et al. | |
| 2006/0133368 | A1 | 6/2006 | Tolliver | |
| 2006/0224754 | A1 | 10/2006 | Jain et al. | |
| 2007/0103829 | A1 * | 5/2007 | Darshan | H04L 12/10 361/90 |
| 2007/0257780 | A1 | 11/2007 | Schindler | |
| 2007/0281755 | A1 | 12/2007 | Dwelley | |
| 2008/0005600 | A1 | 1/2008 | Diab et al. | |
| 2008/0052546 | A1 | 2/2008 | Schindler et al. | |
| 2008/0114997 | A1 | 5/2008 | Chin | |
| 2008/0162973 | A1 * | 7/2008 | Landry | H04L 12/10 713/340 |
| 2008/0168283 | A1 | 7/2008 | Penning | |
| 2008/0244282 | A1 | 10/2008 | Hansalia et al. | |
| 2008/0256371 | A1 * | 10/2008 | Diab | H04L 12/10 713/300 |
| 2008/0256598 | A1 | 10/2008 | Diab | |
| 2009/0228722 | A1 | 9/2009 | Lin | |
| 2010/0007334 | A1 | 1/2010 | Apfel | |
| 2010/0031066 | A1 | 2/2010 | Geiger et al. | |
| 2010/0049881 | A1 | 2/2010 | Manor et al. | |
| 2010/0078992 | A1 | 4/2010 | Landry et al. | |
| 2010/0153750 | A1 | 6/2010 | Shah | |
| 2010/0205466 | A1 | 8/2010 | Diab et al. | |
| 2010/0309904 | A1 * | 12/2010 | Couse | H04M 1/2535 370/352 |
| 2011/0217873 | A1 | 9/2011 | Diab et al. | |
| 2011/0320833 | A1 | 12/2011 | R. et al. | |
| 2012/0228936 | A1 | 9/2012 | Kabbara et al. | |
| 2012/0246458 | A1 | 9/2012 | Jain et al. | |
| 2013/0013936 | A1 | 1/2013 | Lin et al. | |
| 2013/0033978 | A1 | 2/2013 | Eckert et al. | |
| 2013/0103958 | A1 | 4/2013 | Hua et al. | |
| 2013/0339760 | A1 | 12/2013 | Zimmerman et al. | |
| 2014/0129855 | A1 | 5/2014 | Hamdi et al. | |
| 2014/0195831 | A1 | 7/2014 | Hamdi et al. | |
| 2014/0245031 | A1 | 8/2014 | Hamdi et al. | |
| 2014/0245054 | A1 | 8/2014 | Hamdi et al. | |

* cited by examiner

POWER OVER ETHERNET DYNAMIC POWER ALLOCATION SYSTEM

CROSS-REFERENCE TO RELATED APPLICATIONS

The present application is a Continuation Application of U.S. Utility application Ser. No. 13/776,466, filed on Feb. 25, 2013, which is related to U.S. Utility application Ser. No. 13/671,135, filed on Nov. 7, 2012; U.S. Utility application Ser. No. 13/738,364, filed on Jan. 10, 2013; and U.S. Utility application Ser. No. 13,776,420, filed on Feb. 25, 2013, the disclosures of which are assigned to the assignee of record in the present application and incorporated herein by reference in their entirety.

BACKGROUND

The present disclosure relates generally to information handling systems, and more particularly to dynamic power allocation for information handling systems receiving power using power over Ethernet technology.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs use Power over Ethernet (PoE) technology to send power and data to other IHSs and/or receive power and data from other IHSs. PoE technology provides for the transmission of power, along with the data, safely over Ethernet cabling. The original Institute of Electrical and Electronics Engineers (IEEE) 802.3af standards provide up to 15.4 watts (W) of DC power (minimum 44 volts (V) direct current (DC) and 350 milliamps (mA)), while the updated IEEE 802.3at standards (also known as PoE+) provides up to 25.5 W. The IEEE 802.3af and IEEE 802.3at standards provide for the classification of powered devices (PDs) based on a predefined control protocol or hardware classification, and the power sourcing equipment (PSE) device statically assigns the power level of the power that will be provided to the PD based on the amount designated in the standards for the PD's classification. There are currently 5 classifications: Class 0, the default classification, provides for devices that draw a current of 0-4 mA and a power range of 0.44-12.94 W. Class 1 provides for devices that draw a current of 9-12 mA and a power range of 0.44-3.84 W. Class 2 provides for devices that draw a current of 17-20 mA and a power range of 3.84-6.49 W. Class 3 provides for devices that draw a current of 26-30 mA and a power range of 6.49-12.95 W. Class 4, used by 802.3at devices, provides for devices that draw a current of 36-44 mA and a power range of 12.95-25.5 W.

The static assignment by the PSE device of the power level that will be provided to a PD based on the classification discussed above raises a number of issues. Such static assignments result in the PSE device statically allocating the maximum amount of power needed by a PD of that class when operating (e.g., a PD classified as a class 3 device results in the PSE statically allocating 12.95 W to that PD even if that PD actually draws a maximum of only 8 W power.) Thus, current PoE power systems are inefficient in their allocation of power due to their static assignment of power to PDs based on a classification that can result in the PSE assigning more power to a PD than is necessary.

Accordingly, it would be desirable to provide an improved PoE power allocation system.

SUMMARY

According to one embodiment, a power allocation system includes a manager provided on a network controller; and an agent provided on a line module, wherein at least one of the manager and the agent are operable to: detect a connection of a powered device to a port on the line module; classify the powered device; provide a first power to the powered device through the port from a global power budget according to the classification; monitor the power consumption of the powered device subsequent to providing the first power; and provide a second power to the powered device through the port from the global power budget according to the monitoring, wherein the second power is different from the first power.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
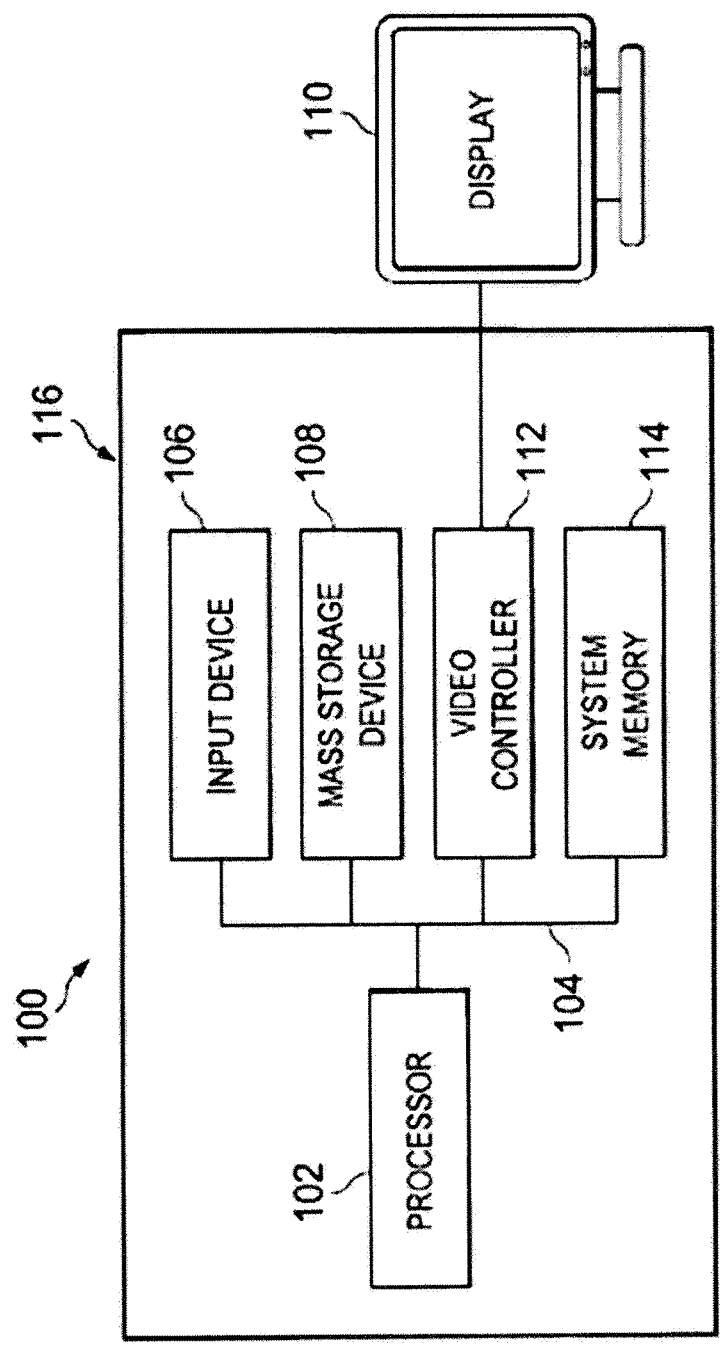
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
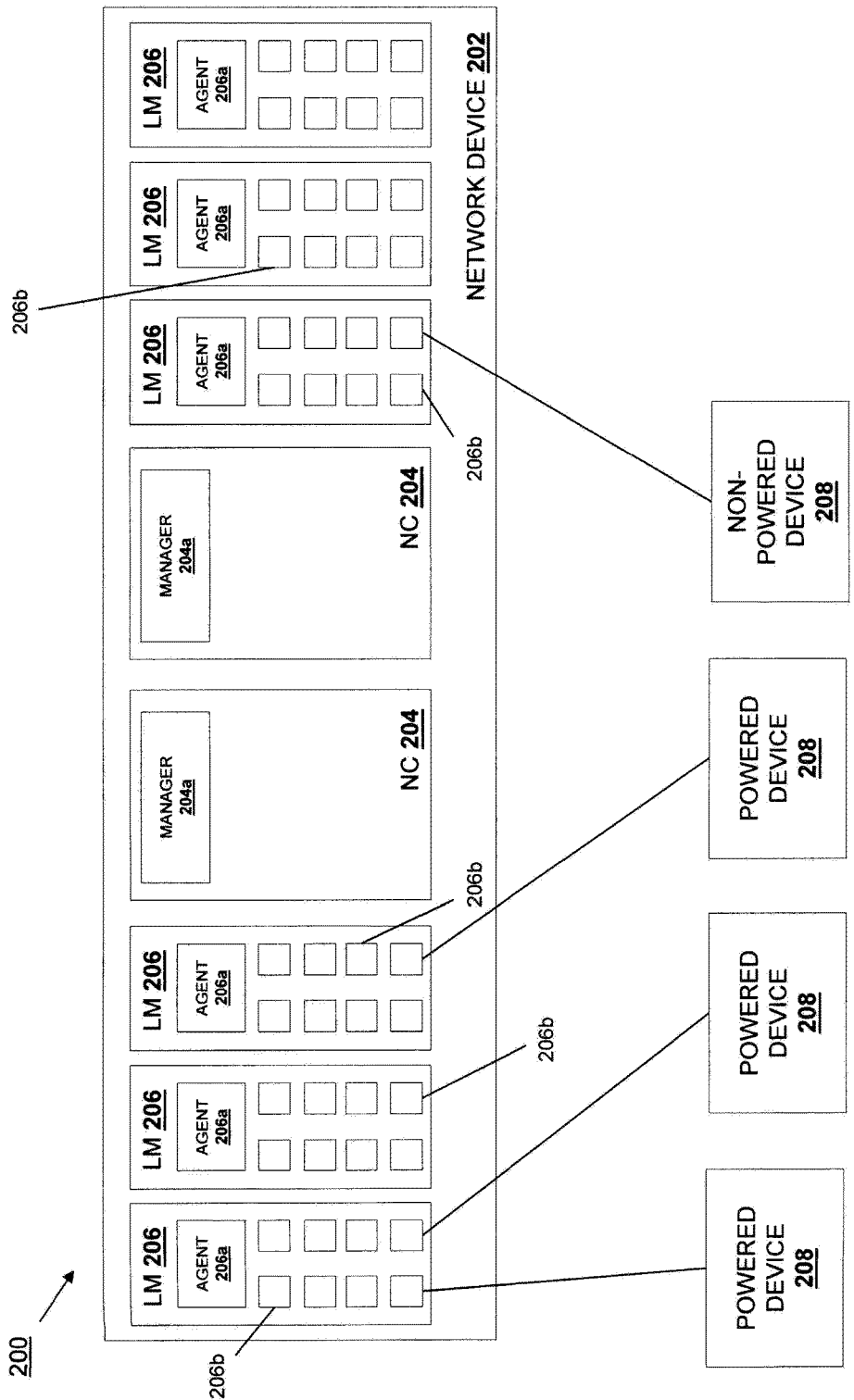
FIG. 2 is a schematic view illustrating an embodiment of a networked system.

Referring now to FIG. 2, an embodiment of a networked system 200 is illustrated. The networked system 200 includes a network device 202 that may be the IHS 100 discussed above with reference to FIG. 1 or may be some of the components of the IHS 100. In an embodiment, the network device 202 may include a switch or other network device known in the art. The network device 202 of the illustrated embodiment includes a pair of Network Controllers 204 and a plurality of line modules 206 that are each coupled together using methods known in the art. For example, a centralized switching application specific integrated circuit (ASIC) may be implemented on a network controller 204 and connected to each of the line modules 206. Each network controller 204 and line module 206 may include a processor system and memory system. In the illustrated embodiment, each network controller 204 includes instructions on its memory system that, when executed by its processing system, cause the processing system to provide a manager 204a that is operable to perform the functions discussed below. In the illustrated embodiment, each line module 206 includes instructions on its memory system that, when executed by its processing system, cause the processing system to provide an agent 206a that is operable to perform the functions discussed below.

The line modules 206 and their ports 206b may or may not be operable to provide Power over Ethernet (PoE), which is a technology that allows the network device 202 to pass electrical power, along with data, safely over Ethernet cabling to connected devices. Thus, some or all of the line modules 206 may be PoE capable and some of the line modules 206 may not be PoE capable. Furthermore, devices may be connected to any of the ports 206b on the line modules 206 that may or may not be PoE capable (i.e., operable to receive electrical power, along with data, safely over Ethernet cabling). In the illustrated embodiment, powered devices 208 are coupled to ports 206b on different line modules 206, while a non-powered device 210 is coupled to a port 206b on a line module 206. In an embodiment, the powered devices 208 may include information handling systems such as, for example, Internet telephones, routers, personal computers, servers, port extenders, and/or a variety of other IHS powered devices known in the art.

In the illustrated embodiment, managers 204a have been illustrated as provided on each network controller 204, and agents 206a have been illustrated as provided on each line module 206. However, the number and locations of managers 204a and agents 206a in the networked system 200 may vary greatly while still being operable to provide the functionality discussed below. For example, a single manager 204a may be provided on one of the network controllers 204 (e.g., with no manager 204a provided on the other network controller 204.) In another example, manager(s) and agent(s) may each be provided on the network controller(s) 204 or the line module(s). In other words, a manager or managers and an agent or agents may be provided in different physical locations in the networked system 200 other than those illustrated while still allowing for the functionality discussed below.

Figure 3:
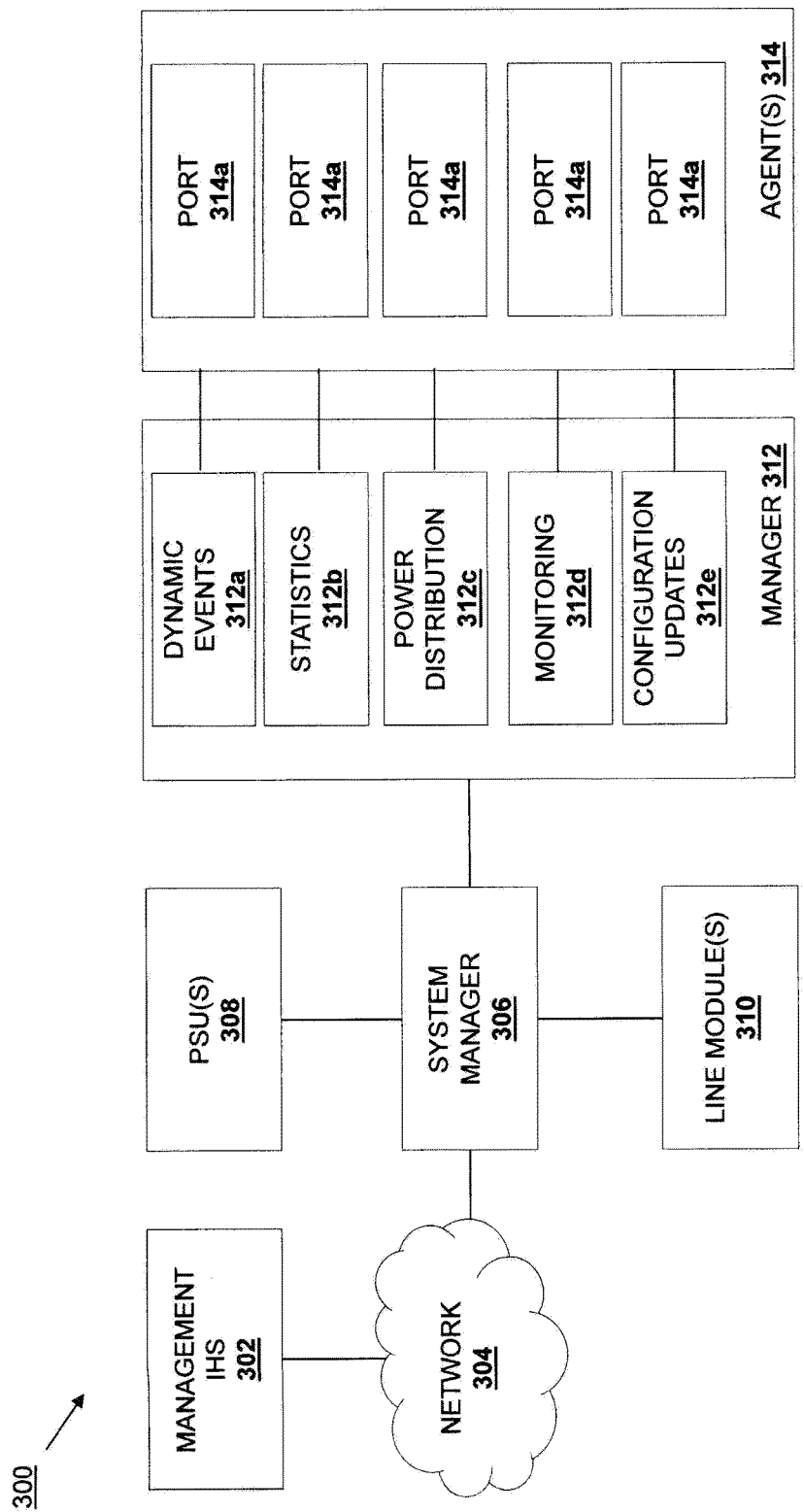
FIG. 3 is a schematic view illustrating an embodiment of a power management architecture in the network device of FIG. 2.

Referring now to FIG. 3, an embodiment of an optimized PoE power allocation system 300 is illustrated that includes some of the elements of the networked system 200 discussed above with reference to FIG. 2. While some of the elements of the elements of the networked system 200 of FIG. 2 are not illustrated in the optimized PoE power allocation system 300, those elements may be present (e.g., as discussed above in the networked system 200) but have been omitted for clarity of discussion. The optimized PoE power allocation system 300 includes a management IHS 302 connected to a network 304. In an embodiment, the management IHS 302 may be, for example, a web-based systems management graphical user interface (GUI) or simple network management protocol (SNMP), and/or a variety of other management IHSs known in the art. A system manager 306 that oversees the management of the system and provides the necessary interfaces to system hardware is coupled to the network 304, one or more Power Supply Units (PSUs) 308, one or more line modules 310, and a manager 312 that may be either or both of the managers 204a on the network controllers 204 in the network device 200 of FIG. 2. The manager 312 is operable to perform functions such as, for example, detecting of dynamic events 312a, recording of statistics 312b, distribution of power 312c, monitoring 312d, configuration updates 312e, and/or a variety of other PoE management functions known in the art. The manager 312 is coupled to one or more agents 314 that monitor a plurality of ports 314a on the one or more line modules 310. While the one or more agents 314 are illustrated in the optimized PoE power allocation system 300 as separate from the one or more line modules 310, as discussed above, agents 206b may be provided on the line module 206 as illustrated in FIG. 2.

Figure 4:
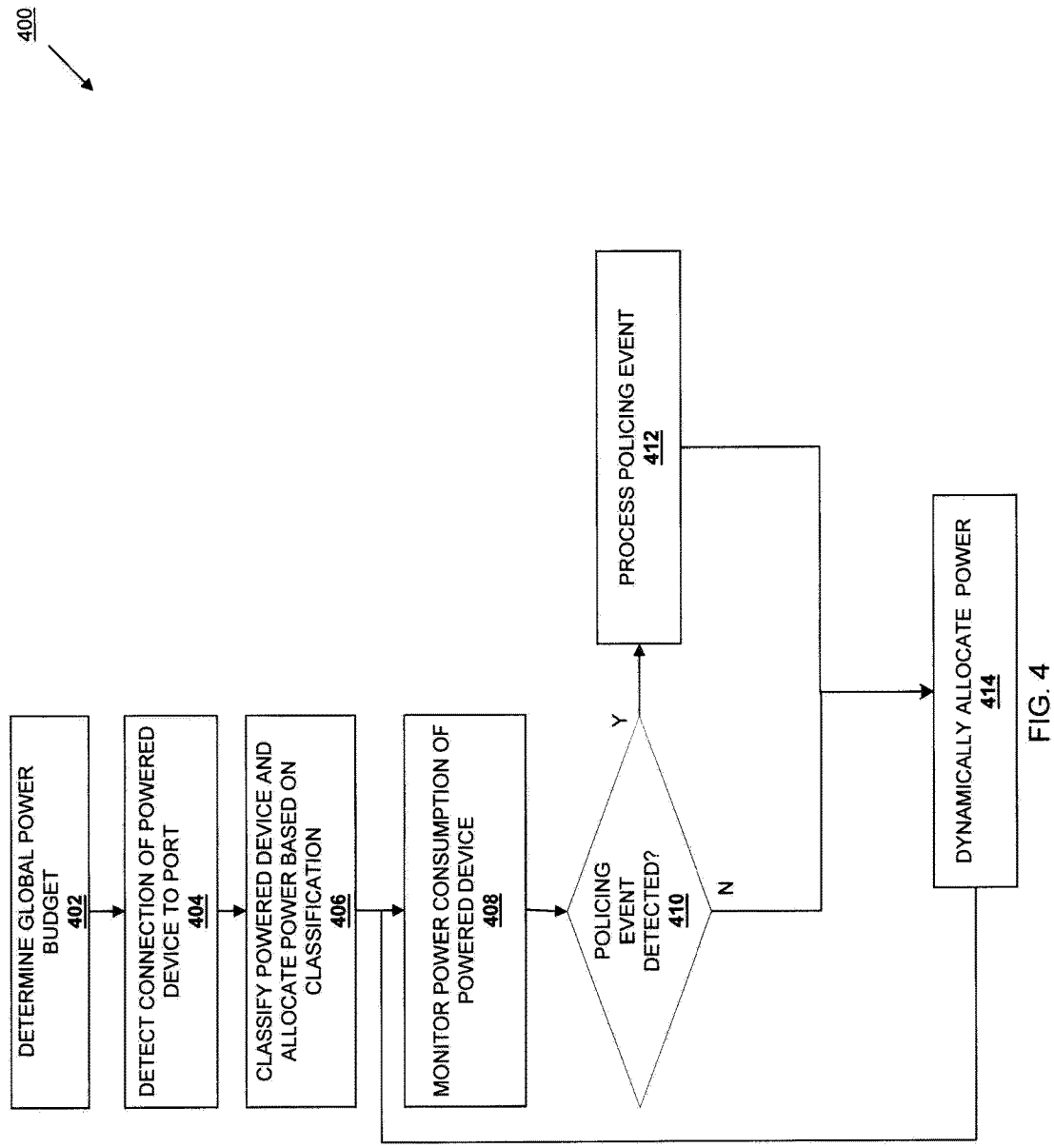
FIG. 4 is a flow chart illustrating an embodiment of a power allocation method.

Referring now to FIG. 4, an embodiment of a power allocation method 400 is illustrated that may be performed using the networked system 200, discussed above with reference to FIG. 2, and/or the optimized PoE power allocation system 300, discussed above with reference to FIG. 3. The method 400 begins at block 402 where a global power budget is determined. As discussed above, a network device (e.g., the network device 202) includes a plurality of ports (e.g., the ports 206b) that are operable to connect to and provide data and power to powered devices safely over Ethernet cabling, as well as connect to and provide data to non-powered device (i.e., devices that receive data through the ports but receive power through a separate connection to a power source.) In an embodiment, a manager 204a in a network controller 204 communicates with agents 206a on the line modules 206 to determine the power requirements of a plurality of PoE powered device 208 connected to PoE ports 206b on the line modules 206 (discussed in further detail below). The manager 204a in the network controller 204 also determines a total power supplied from one or more PSUs (e.g., the one or more PSUs 308 discussed with reference to FIG. 3). The manager may 204a may then determine a global power budget by allocating power from the total power supplied from the PSU(s) 308 to each of the connected powered devices according to their power requirements (discussed in further detail below). Thus, at block 402 a global power budget is determined that allocates power available to the network device 200 to a plurality of powered devices 208 connected to and powered via the ports 206b on the line modules 206. In an embodiment, allocation of power from the global powered budget to connected powered devices 208 may be based upon profiles for the ports, priorities of the ports, powered device classifications, and/or configurations provided by a user, as well as power consumption of the powered devices. While block 402 is illustrated as occurring once in the method 400, the global power budget may be re-determined periodically in response to, for example, the connection of an additional powered device, the disconnection of a powered device, a change in the power available to the network device 202, and/or due to a variety of other scenarios known in the art, as discussed below.

The method 400 then proceeds to block 404 where the connection of a powered device to a port is detected. In an embodiment, at block 404, a powered device 208 is connected via Ethernet cabling to one of the PoE ports 206b on one of the line modules 206, and that connection is detected by an agent 206a located on that line module 206 or coupled to that line module 206. The agent 206a then reports that connection to the manager 204a on the network controller 204. While an example of an agent 206a on the line module 206 detecting the connection to the port 206b and then communicating that to a manager 204a on the network controller 204 has been provided, as discussed above, agents and managers may be provided in different location (e.g., both on the network controller 204), and functions described as being performed by an agent or manager may be performed by the other in other embodiments. While not discussed in detail herein, the connection of a non-powered device (e.g., the non-powered device 210) to a PoE port 206b may be detected and result in no powered being allocated from the global power budget to that port 206b.

The method 400 then proceeds to block 406 where the powered device is classified and power is allocated to the powered device based on the classification. In an embodiment, the detection of the connection of the powered device 208 to the port 206b at block 404 may include the detection of a classification signature resistance or current by the agent 206b that is conveyed to the manager 204a and used to classify the powered device 208. For example, a classification current of 9-12 milliAmps (mA) may classify the powered device 208 as a Class 1 device that should be supplied a static power of 3.84 Watts, a classification current of 17-20 mA may classify the powered device 208 as a Class 2 device that should be supplied a static power of 6.49 Watts, a classification current of 6.49-12.95 mA may classify the powered device 208 as a Class 3 device that should be supplied a static power of 12.95 Watts, and a classification current of 36-44 mA may classify the powered device 208 as a Class 4 device that should be supplied a static power of 25.5 Watts. In response to the classification, the manager may allocate power from the global power budget and provide that allocated power to the powered device 208 connected at block 404 according to the classification (e.g., by supplying a static power output from the total power supplied to the network device 200 by the PSU(s) 308 to that powered device 208 according to its classification.) In one specific example, the powered device 208 connected to the network device 202 may be a PoE capable port extender that is a Class 3 PoE device, and in response to the classification of the port extender, the manager 204a in the network device 202 allocates 12.95 watts of power from global power budget and provides the 12.95 watts (i.e., a first power output) to the port extender based on its class 3 classification.

The method 400 then proceeds to block 408 where the power consumption of the powered device is monitored. In the loop of the method 400 discussed below (e.g., blocks 408, 410, 412, and/or 414), the powered device 208 connected at block 404 of the method 400 is discussed. However, it should be understood that this loop of the method 400 may be performed for any powered device 208 connected to and receiving power from the network device 202. In an embodiment, at block 408, the agent 206a on the line module 206, which includes the port 206b to which the powered device 208 was connected at block 404, monitors the powered consumption of the powered device 208 (subsequent to the allocation and provision of power according to the classification in block 406) and communicates the results of that monitoring to the manager 204a. For example, the current draw on the port 206b to which the powered device 208 is connected may be monitored by a hardware detect mechanism that is coupled to the agent 206b on the line module 206 that includes that port 206b, and the agent 206b may provide current draw information from the hardware detect mechanism to the manager 204a. In another example, communication between the powered device 208 and the agent 206b may provide for the monitoring of the power consumption of the powered device 208. In some embodiments, the monitoring of power consumption at block 408 may include averaging the monitored power consumption by the powered device 208 through the port 206b over predetermined intervals to determine an average monitored power consumption by the powered device 208 through the port 206b. Returning to the specific example discussed above, a class 3 port extender that was classified and allocated 12.95 watts of power according to the classification at block 406 may be monitored at block 408 and determined to be consuming an average power of 8 watts. In other embodiments, the monitoring of the power consumption of the powered device 208 may include monitoring the power states of the powered device (e.g., active, sleep, power-save, off, etc.) and/or power profiles for the powered device 208 or its connected port 206b.

The method 400 then proceeds to decision block 410 where it is determined whether a policing event has been detected. In an embodiment, policing events may be detected by the manager 204a and/or the agents 206b and may include, for example, a PSU 308 failure, the connection of a PSU 308 to the network device 202, the connection of another powered device 208 to the network device 202, the disconnection of a powered device 208 from the network device 202, a line module 206 failure, the connection of a line module 206 to the network device 202, a power state change of a powered device 208, a Command Line Interface (CLI) configuration change in the network device 202, a Link Layer Discovery Protocol change, a powered device 208 attempting to consume more power than its classification, the failure of a powered device 208, and/or a variety of other policing events known in the art.

If, at decision block 410, it has been determined that a policing event has occurred, the method 400 then proceeds to block 412 where the policing event is processed. In an embodiment, processing of the policing event may include several actions not directly related to the allocation of power through the ports 206b such as, for example, disabling a port 206b that has had its powered device 208 disconnected or experience a failure, applying a configuration change, and/or a variety of policing event processing actions known in the art. However, only the processing related to power allocation is discussed herein. Thus, at block 412, the policing event may be processed to determine how that policing event affects the global power budget, affects the power consumption of each of the powered devices, affects the power available to the network device, and/or affects other power allocation related factors. For example, the processing at block 412 may include re-determining the global power budget 208, reclassifying a powered device, and/or performing a number of other processing actions known in the art.

If no policing event is detected at block 410, or following the processing of the policing event at block 412, the method 400 proceeds to block 414 where power is dynamically allocated. In an embodiment, no policing event is detected at decision block 408, but the power consumption of the powered device 208 monitored at block 408 is less than the power allocated to the powered device 208 according to the classification at block 206, and at block 414, the manager 204a allocates the monitored power consumption (e.g., the average monitored power consumption) from the global power budget to the powered device 208 and provides that allocated power to the powered device 208 through the port 206b. In another embodiment, a policing event is detected at decision block 410 and processed at block 412 that causes the power consumption of the powered device 208 to change (e.g., from the allocated based on the classification at block 406 or monitored at block 408), and at block 414, the manager 204a allocates power from the global power budget to the powered device 208 based on the processing of the policing event and provides that power to the powered device 208 through the port 206b. In another embodiment, a policing event is detected at decision block 410 and processed at block 412 that causes the power available to the network device 202 to change (e.g., from the total power supplied by the PSU(s) 308 that was used to determine the global power budget at block 402), and at block 414, the manager 204a allocates power from the global power budget to the powered device 208 based on the processing of the policing event and provides that power to the powered device 208 through the port 206b. In some embodiments, the monitor power consumption and detected and processed policing event (or lack of detection of a policing event) may not result in any change in power consumption of the powered device 208 or power available to the network device 202, and the dynamic allocation of power may result in no changes being performed to the power supplied through the port 206b to the powered device 208 at block 414. Returning to the specific example discussed above, the class 3 port extender that was monitored and determined to be consuming an average power of 8 watts at block 408 may be dynamically allocated and provided approximately 8 watts of power (i.e, a second power output), or 8 watts plus some additional power amount to compensate for line attenuation or power demand surges by the port extender, from the global power budget. The remaining power allocated according to the classification (e.g., in this example, 4.95 watts, which is the different between the 12.95 watts allocated according to the classification of the port extender and the 8 watts allocated according to the monitoring of the port extender) is returned then to the global power budget. Similarly, a policing event may be detected at decision block 410 and processed at block 412 that affects the power allocation to the powered device 208, and a dynamic allocation of power may be performed at block 414 similarly as described above but in response to (and based upon) the processing of that policing event.

The method 400 then returns to block 408 where power consumption of the powered device connected at block 404 is monitored. The method 400 may then loop through blocks 408, 410, 412, and 414 substantially as described above to continue to monitor power consumption and detect policing events that affect the power allocated to the powered device 208, and dynamically allocate power to that powered device 208 in response. Continuing with the specific example above, the class 3 port extender that was allocated 8 watts according to the monitoring in block 408 may be monitored in a subsequent performance of block 408 and determined to be consuming more or less power, and at block 414, the port extender may be allocated and provided a third power output according to that monitoring. As discussed above, the looping of blocks 408, 410, 412, and 414 of the method 400 may be performed for any powered device connected to a port 206b on the network device 202 such that the manager 206b operates to dynamically allocate power to each of the powered device 208 from the global power budget serially or in parallel.

Thus, a system and method have been described that dynamically adjusts power delivery to classified powered devices after the static assignment of power to those powered devices based on the classification of those powered devices. The dynamic power consumption of each classified powered device is monitored and may be averaged over predetermined intervals to determine the actual power consumption of each powered device, and the actual power consumption of each powered device may then be used to allocate power from a global power budget such that excess power that would be allocated according to the classification of each powered device may be returned to the global power budget. The systems and methods of the present disclosure provide an enhancement to existing Institute of Electrical and Electronics Engineers (IEEE) 802.3at/af standards as well as Energy Efficient Ethernet (EEE) specifications and are applicable to any power sourcing equipment and powered devices utilizing PoE technology.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power allocation system, comprising:
   a plurality of ports; and
   a management subsystem that is coupled to the plurality of ports and that is configured, for each port of the plurality of ports, to:
   determine, based on a classification current drawn by a device connected to that port, a first classification that includes a first classification power range for the device;

provide, subsequent to determining the first classification for the device, a first power amount to the device through that port according to the first classification;

monitor, at that port, power consumption of the device subsequent to providing the first power amount and, in response, determine that the device is attempting to consume a second power amount that is greater than the first power amount that was provided to that port according to the first classification and that is outside of the first classification power range;

reclassify, in response to the determination that the device is attempting to consume the second power amount and using power draw information from the monitored power consumption, the device connected to that port with a second classification that includes a second classification power range that is different than the first classification power range; and provide, subsequent to reclassifying the device with the second classification, the second power amount that is greater than the first power amount to the device through that port according to the second classification.

2. The system of claim 1, wherein the management subsystem is configured for each port of the plurality of ports, to:

monitor the power consumption of the device subsequent to providing the second power amount and, in response, determine that the device is consuming a third power amount that is different from the second power amount and that is provided for in the second classification; and provide the third power amount to the device through that port.

3. The system of claim 2, wherein the management subsystem is configured for each port of the plurality of ports, to:

average the monitored power consumption of the device over predetermined intervals subsequent to providing the second power amount, wherein the providing the third power amount includes providing the third power amount according to an averaged monitored power consumption.

4. The system of claim 2, wherein the management subsystem is configured for each port of the plurality of ports, to:

monitor the power state of the device subsequent to providing the second power amount, wherein the providing the third power amount includes providing the third power amount according to the monitored power state.

5. The system of claim 1, wherein the first power amount that is provided to the device according to the first classification is a statically assigned power amount according to a Power over Ethernet classification.

6. The system of claim 2, wherein the management subsystem is configured for each port of the plurality of ports, to:

provide the third power amount along with an additional power amount to the device through that port, wherein the additional power amount is determined to compensate at least one of a line attenuation and a power demand surge by the device.

7. The system of claim 2, wherein the management subsystem is configured for each port of the plurality of ports, to:

detect a policing event that caused the device to consume the third power amount that is different than the second power amount.

8. An information handling system (IHS), comprising:
a port;
a processing system coupled to the port; and
a memory system coupled to the processing system and including instructions that, when executed by the processing system, cause the processing system to:

determine, based on a classification current drawn by a device connected to the port, a first classification that includes a first classification power range for the device;

provide, subsequent to determining the first classification for the device, a first power amount to the device through the port according to the first classification;

monitor, at the port, power consumption of the device subsequent to providing the first power amount and, in response, determine that the device is attempting to consume a second power amount that is greater than the first power amount that was provided to the port according to the first classification and that is outside of the first classification power range;

reclassify, in response to the determination that the device is attempting to consume the second power amount and using power draw information from the monitored power consumption, the device connected to the port with a second classification that includes a second classification power range that is different than the first classification power range; and provide, subsequent to reclassifying the device with the second classification, the second power amount that is greater than the first power amount to the device through the port according to the second classification.

9. The IHS of claim 8, wherein the memory system includes instructions that, when executed by the processing system, cause the processing system to:

monitor the power consumption of the device subsequent to providing the second power amount and, in response, determine that the device is consuming a third power amount that is different from the second power amount and that is included in the second classification; and provide the third power amount to the device through the port.

10. The IHS of claim 9, wherein the memory system includes instructions that, when executed by the processing system, cause the processing system to:

average the monitored power consumption of the device over predetermined intervals subsequent to providing the second power amount, wherein the providing the third power amount includes providing the third power amount according to an averaged monitored power consumption.

11. The IHS of claim 9, wherein the memory system includes instructions that, when executed by the processing system, cause the processing system to:

monitor the power state of the device subsequent to providing the second power amount, wherein the providing the third power amount includes providing the third power amount according to the monitored power state.

12. The IHS of claim 8, wherein the first power amount that is provided to the device according to the first classification is a statically assigned power amount according to a Power over Ethernet classification.

13. The IHS of claim 9, wherein the memory system includes instructions that, when executed by the processing system, cause the processing system to:

provide the third power amount along with an additional power amount to the device through the port, wherein the additional power amount is determined to compensate at least one of a line attenuation and a power demand surge by the device.

14. A power allocation method, comprising:

determining, based on a classification current drawn by a device connected to a port, a first classification that includes a first classification power range for the device;

providing, subsequent to determining the first classification, a first power amount to the device through the port according to the first classification;

monitoring, at the port, the power consumption of the device subsequent to providing the first power amount and, in response, determine that the device is attempting to consume a second power amount that is greater than the first power amount that was provided to the port according to the first classification and that is outside of the first classification power range;

reclassifying, in response to the determination that the device is attempting to consume the second power amount and using power draw information from the monitored power consumption, the device connected to the port with a second classification that includes a second classification power range that is different than the first classification power range; and providing, subsequent to reclassifying the device with the second classification, the second power amount that is greater than the first power amount to the device through the port according to the second classification.

15. The method of claim 14, further comprising:

monitoring the power consumption of the device subsequent to providing the second power amount and, in response, determining that the device is consuming a third power amount that is different from the second power amount and that is associated with the second classification; and providing the third power amount to the device through the port.

16. The method of claim 15, further comprising:

averaging the monitored power consumption of the device over predetermined intervals subsequent to providing the second power amount, wherein the providing the third power amount includes providing the third power amount according to an averaged monitored power consumption.

17. The method of claim 15, further comprising:

monitoring the power state of the device subsequent to providing the second power amount, wherein the providing the third power amount includes providing the third power amount according to the monitored power state.

18. The method of claim 14, wherein the first power amount provided to the device according to the first classification is a statically assigned power amount according to a Power over Ethernet classification.

19. The method of claim 15, further comprising:

providing the third power amount along with an additional power amount to the device through the port, wherein the additional power amount is determined to compensate at least one of a line attenuation and a power demand surge by the device.

20. The method of claim 15, further comprising:

detecting a policing event that caused the device to consume the third power amount that is different than the second power amount.

* * * * *